US006362933B1

(12) United States Patent
Sampietro et al.

(10) Patent No.: US 6,362,933 B1
(45) Date of Patent: Mar. 26, 2002

(54) PIEZOELECTRIC HEAD LOADING AND UNLOADING DEVICE FOR RIGID DISC DRIVES

(75) Inventors: Joseph M. Sampietro, Tarzana; Khosrow Mohajerani, Newbury Park; Anoush M. Fard, Agoura Hills; Richard G. Krum, Thousand Oaks; Jeffrey G. Barina, Somis; Muhammad A. Hawwa, Simi Valley, all of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 08/793,474
(22) PCT Filed: Feb. 24, 1997
(86) PCT No.: PCT/US97/02737
  § 371 Date: Feb. 24, 1997
  § 102(e) Date: Feb. 24, 1997
(87) PCT Pub. No.: WO98/37552
  PCT Pub. Date: Aug. 27, 1998

(51) Int. Cl.[7] ................................................. G11B 5/54
(52) U.S. Cl. ...................................................... 360/105
(58) Field of Search .............................. 360/104, 105, 360/106

(56) References Cited

U.S. PATENT DOCUMENTS

| 4,843,502 | A | * | 6/1989 | Tagawa ....................... 360/105 |
| 5,079,652 | A | * | 1/1992 | Ishida et al. .................. 360/75 |
| 5,500,777 | A | * | 3/1996 | Hasegawa et al. ........ 360/77.16 |
| 5,539,596 | A | * | 7/1996 | Fontana et al. ............. 360/106 |

OTHER PUBLICATIONS

"A Flexural Piggyback Milli–Actuator for Over 5 Gbit/in.$^2$ Density Magnetic Recording" by Koganezawa et al., *IEEE Transactions on Magnetics*, vol. 32, No. 5, Sep. 1996, pp. 3908–3910.

"Transverse Mode Electrostatic Microactuator for Mems –Based HDD Slider" by Imamura et al., 0–7803–2985–6/96, *IEEE 1996*, pp. 216–221.

An Experiment for Head Positioning System Using Submicron Track–width GM Head by Yoshikawa et al., *IEEE Transactions on Magnetics*, vol. 32, No. 5, Sep. 1996. pp. 3905–3907.

"Micro Electrostatic Actuators in Dual–Stage Disk Drives with High Track Density" by Tang et al., *IEEE Transactions on Magnetics*, vol. 32, No. 5, Sep. 1996, pp. 3851–3853.

"Piezoelectric Microactuator Cmopensating for Off–Track Errors in Magnetic Disk Drives" by Imamura et al., *Advances in Information Storage Systems*, vol. 5, 1993 American Society of Mechanical Engineers, pp. 119–126.

"A Dual–Stage Magnetic Disk Drive Actuator Using a Piezoelectric Device for a High Track Density" by Munemoto et al., *IEEE Transactions on Magnetics*, vol. 27, No. 6, Nov. 1991, pp. 5298–5300.

"Dynamic Loading Criteria for 3–1/2 inch Inline HDD Using Multilayer Piezoelectric Load/Unload Mechanism" by Kajitani et al., *IEEE Transactions on Magnetics*, vol. 27, No. 6, Nov. 1991, pp. 5079–5081.

* cited by examiner

*Primary Examiner*—George J. Letscher
(74) *Attorney, Agent, or Firm*—Jonathan E. Olson; Shawn B. Dempster; Edward P. Heller, III

(57) ABSTRACT

A system for loading a transducing head (22) to a flying elevation proximate a rotating surface of a disc (16) is disclosed. The system includes a piezoelectric device (40) that is selectively expanded and contracted to control a height of the head (22) on a flexure spring (14) from the surface of the disc (16). The system preferably includes control circuitry (50) for generating electrical control signals to manage the expansion and contraction of the piezoelectric device (40) according to operating characteristics of the disc (16).

11 Claims, 5 Drawing Sheets

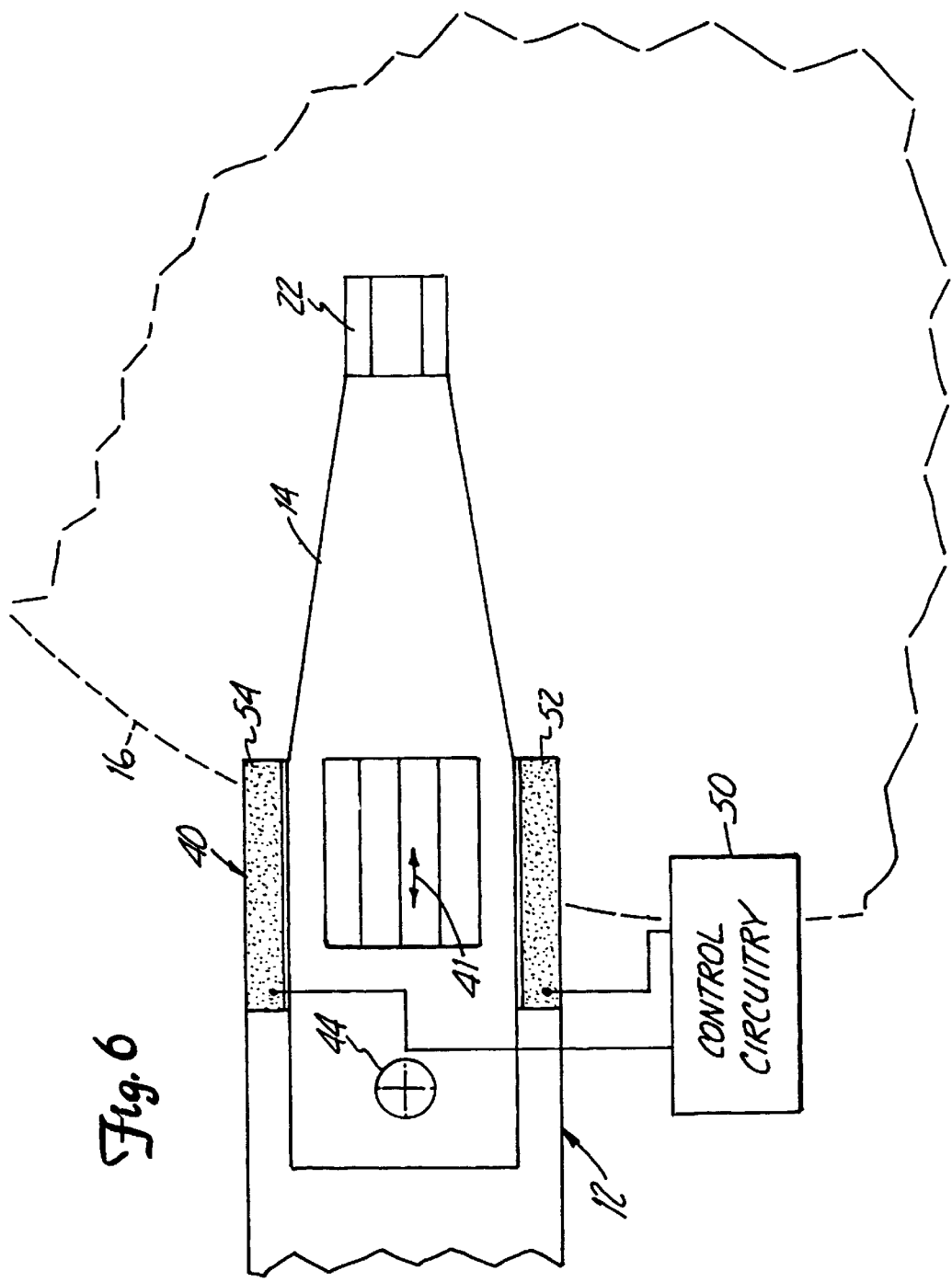

PIEZOELECTRIC HEAD LOADING AND UNLOADING DEVICE FOR RIGID DISC DRIVES

BACKGROUND OF THE INVENTION

The present invention relates to positioning of heads in a disc drive, and more particularly relates to a device for loading and unloading a magnetic head for a disc drive utilizing a piezoelectric element for flexure control.

Rotating disc drives operate by positioning a transducing head on a slider a small distance from a rotating disc surface. The slider is mounted on a flexure to "fly" the head over the disc. Wind from the disc's rotation elevates the slider a small distance from the surface of the disc. The slider is designed with aerodynamic properties that allow the wind to keep it aloft. The flexure connects the head to an actuator arm and has a spring bias to land the head on the disc when the disc is not rotating, yet is sufficiently flexible to permit the slider to elevate over the disc surface due to dynamic wind forces.

Beginning and ending of the "flying" period can be problematic when the rotation (and thus wind) of the disc starts and stops. When the disc is not rotating, there is no wind resistance to keep the head aloft, which will cause the head to fall to the surface of the disc due to the bias of the flexure spring. This situation is typically handled by dedicating a portion of the disc as a "landing zone" for the head to land on. Landing zones are usually textured to reduce stiction and do not contain data. In this configuration, heads "take off" from a landing zone on the disc when the disc begins rotating, due to the wind created by the disc's rotation. The force required for takeoff is not always constant. Stiction between the slider and the landing zone of the disc changes with environmental conditions. Changes in takeoff force can result in inaccurate timing and lost data. The need for a dedicated landing zone reduces the available space for encoding data on the disc, and variable takeoff force from a contacting position on the disc negatively affects the operation of the disc drive system. Therefore, it is apparent that taking off and landing a head on the disc is an imperfect method of loading a head to read and write data.

One method developed to avoid the problems of taking off and landing a ramp or other mechanical engagement device to engage the flexure spring to hold the slider and head above the elevation of the disc surface. The disc begins rotating while the head is out of the disc region, so that the slider does not contact the disc and stiction is therefore not present. This solution involves extra design efforts, manufacturing, and complexity in the starting and stopping operations of the disc drive, and also requires extra space so that the actuator arm can swing into a parked position, off of the data cylinders associated with the disc.

Therefore, there is a need in the disc drive art for an improved head loading and unloading system to control the height of heads and position of flexure springs with respect to the surface of a disc.

SUMMARY OF THE INVENTION

The present invention is a system for positioning a transducing head at a flying elevation proximate a rotating surface of a disc. Control circuitry generates electrical control signals to manage the operation of the positioning system according to operating characteristics of the disc. The system includes an actuator arm and a flexure spring connected to the actuator arm and carrying the head. A piezoelectric device is operatively attached to the flexure spring to control an elevation of the head on the flexure spring from the surface of the disc in response to the electrical control signals from the control circuitry.

One aspect of the invention is an improvement to a disc drive system. The disc drive system includes a rotatable disc having a surface, a transducing head, an actuator arm, a flexure spring connected to the actuator arm and carrying the head, and control circuitry for generating electrical control signals to position the head proximate a predetermined area on the surface of the disc. The improvement is a piezoelectric device operatively attached to the flexure spring to control a height of the head on the flexure spring from the surface of the disc in response to the electrical control signals from the control circuitry.

Another aspect of the invention is a device for loading and unloading a transducing head in a disc drive system. The device includes an actuator arm and a flexure spring connected to the actuator arm and carrying the head. A system operates to move the head on the flexure spring to a first position distant from a disc during an unloading condition, and to move the head on the flexure spring to a second position closer to the disc surface than the first position during a loading condition.

A further aspect of the invention is a loading device for loading a transducing head in a disc drive system. The system includes a rotatable magnetic disc media device having a surface containing a plurality of tracks on which data may be recorded. The head is mounted to a flexure spring which is mounted to an actuator arm for positioning adjacent a selected track to communicate data to and from the selected track. The head has aerodynamic characteristics so that the head flies over the disc surface when the disc is rotated. The loading device includes a piezoelectric device mounted to an actuator arm and an operator mounted to the flexure spring engaging the piezoelectric device. The loading device further includes means for selectively expanding and contracting the piezoelectric device to move the operator engaging the piezoelectric device to selectively load the head.

BRIEF DESCRIPTION OF THE DRAWINGS

FIG. 6 is a detailed diagrammatic illustration showing a top view of an alternative embodiment of a single actuator arm of the present invention.

DETAILED DESCRIPTION OF THE PREFERRED EMBODIMENTS

Figure 1:
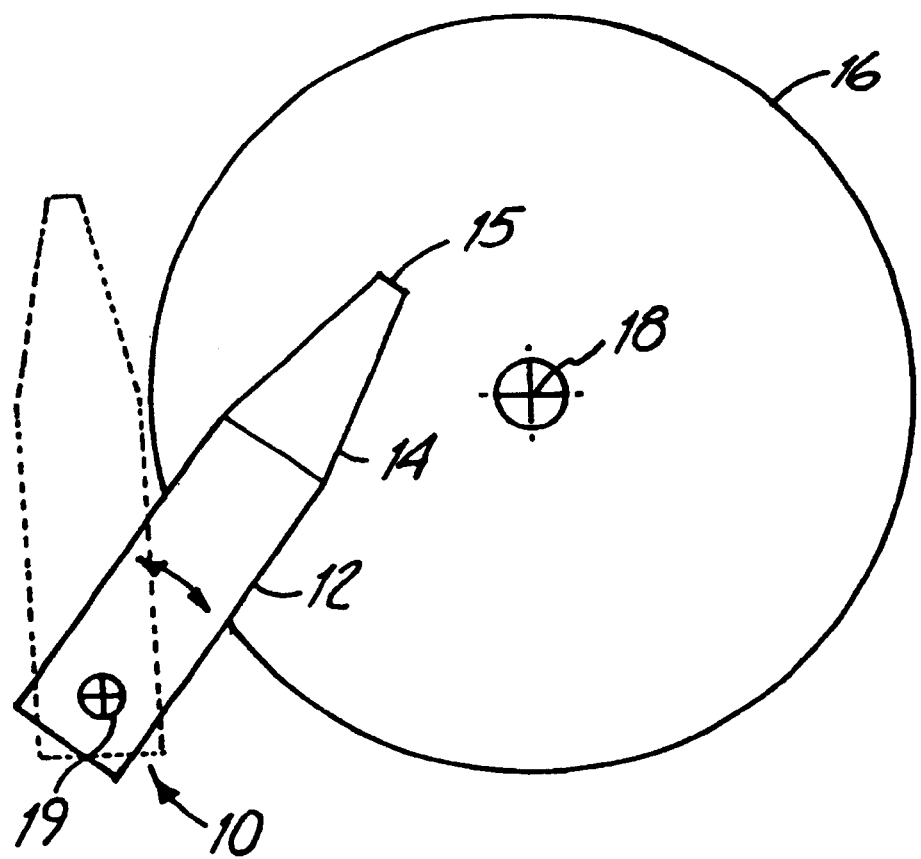
FIG. 1 is a diagrammatic illustration showing a top view of an actuator arm and flexure spring positioned proximate a rotating disc.

FIG. 1 shows a top view of a typical head positioning system 10. The head positioning system includes an actuator arm 12, which supports a flexure spring 14. The flexure spring 14 carries a slider and head (not shown) at the distal end 15 for reading and/or writing information on disc 16. Disc 16 rotates around its axis 18 so that data encoded on concentric tracks of the disc 16 pass by the head when it is positioned over a track of disc 16.

The actuator arm 12 is movable between a position where the head engages data tracks of disc 16 (as shown in FIG. 1) and a disengaged position where the head does not engage a data track of disc 16. The disengaged position may be off the cylinder of the disc, as shown in phantom in FIG. 1, or may be adjacent a dedicated landing zone on the disc. In either case, actuator arm 12 moves between the engaged and disengaged positions by pivoting around an axis 19 of an actuator spindle (not shown in FIG. 1).

Figure 2:
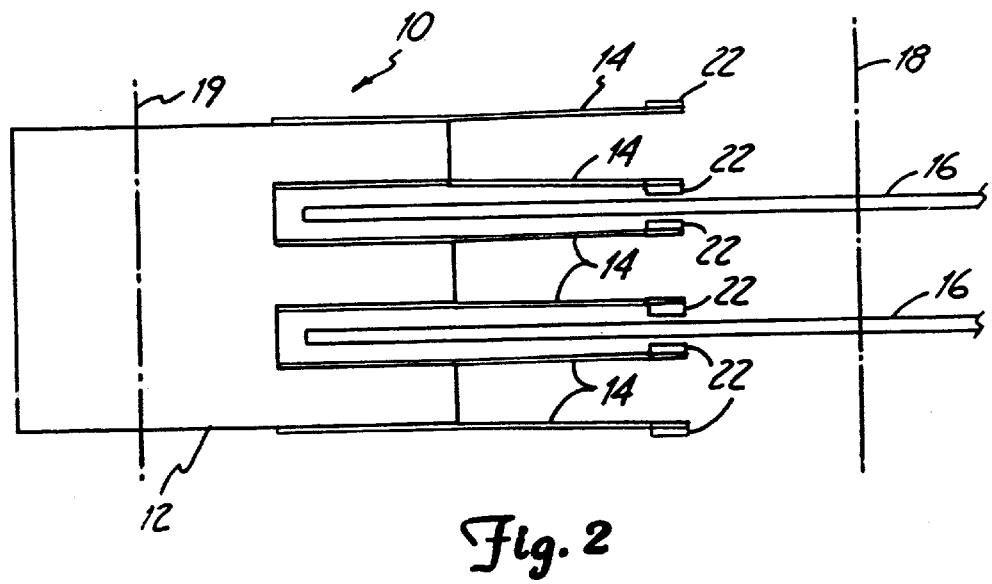
FIG. 2 is a diagrammatic illustration showing a side view of an E-block having a plurality of flexure springs and associated heads proximate several rotating discs.

FIG. 2 shows a side view of the typical head positioning system 10 in a multiple disc arrangement. The actuator arm 12 is implemented as an E-block, which is able to support a plurality of flexure springs 14 for a like plurality of surfaces of discs 16. Discs 16 are coaxially stacked, with a common disc spindle axis 18 around which they rotate. Flexure springs 14 are biased toward discs 16, but are compliant in nature to allow sliders 22 on which transducing heads are mounted to "fly" above the surface of the discs 16 due to the aerodynamic design of sliders 22. In this way, the head on slider 22 can be positioned a small distance from the surfaces of discs 16 to allow reading and writing of data on the discs 16 when they are rotating.

Figure 3:
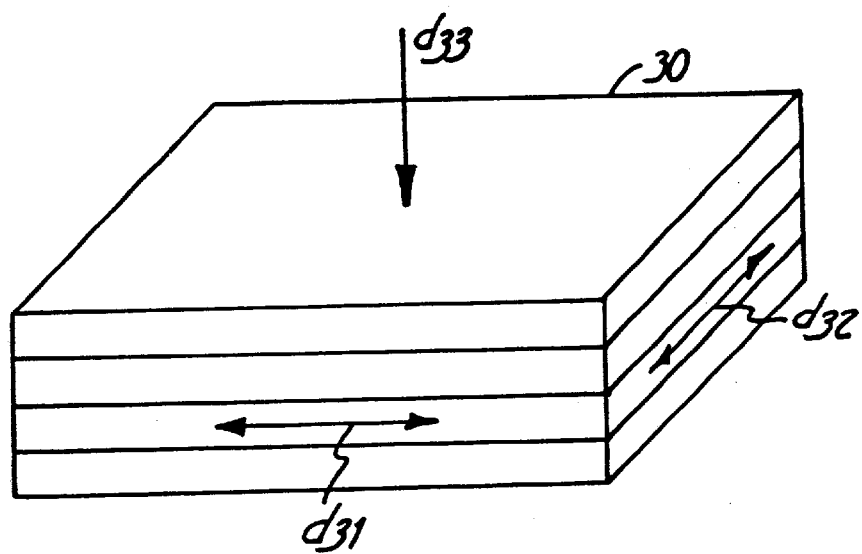
FIG. 3 is a perspective view of a typical piezoelectric cube comprised of a plurality of piezoelectric layers.

FIG. 3 shows a stacked piezoelectric element 30. Element 30 is shown with three axes, labeled d31, d32 and d33. The d33 axis is parallel to the direction of polarization in the piezoelectric element 30. A positive voltage between spatially separated points along the d33 axis causes expansion or contraction of element 30 in the d33 direction, and a corresponding contraction or expansion of element 30 in the d31 direction. The polarization of the applied voltage will determine whether the element expands or contracts in a given direction. Each layer of the stacked element 30 expands or contracts in the d33 direction, and contracts or expands in the d31 direction. Thus, a piezoelectric element 30 can be used to expand or contract in the d33 direction based on an applied voltage, with a corresponding contraction or expansion in the d31 direction.

Figure 4:
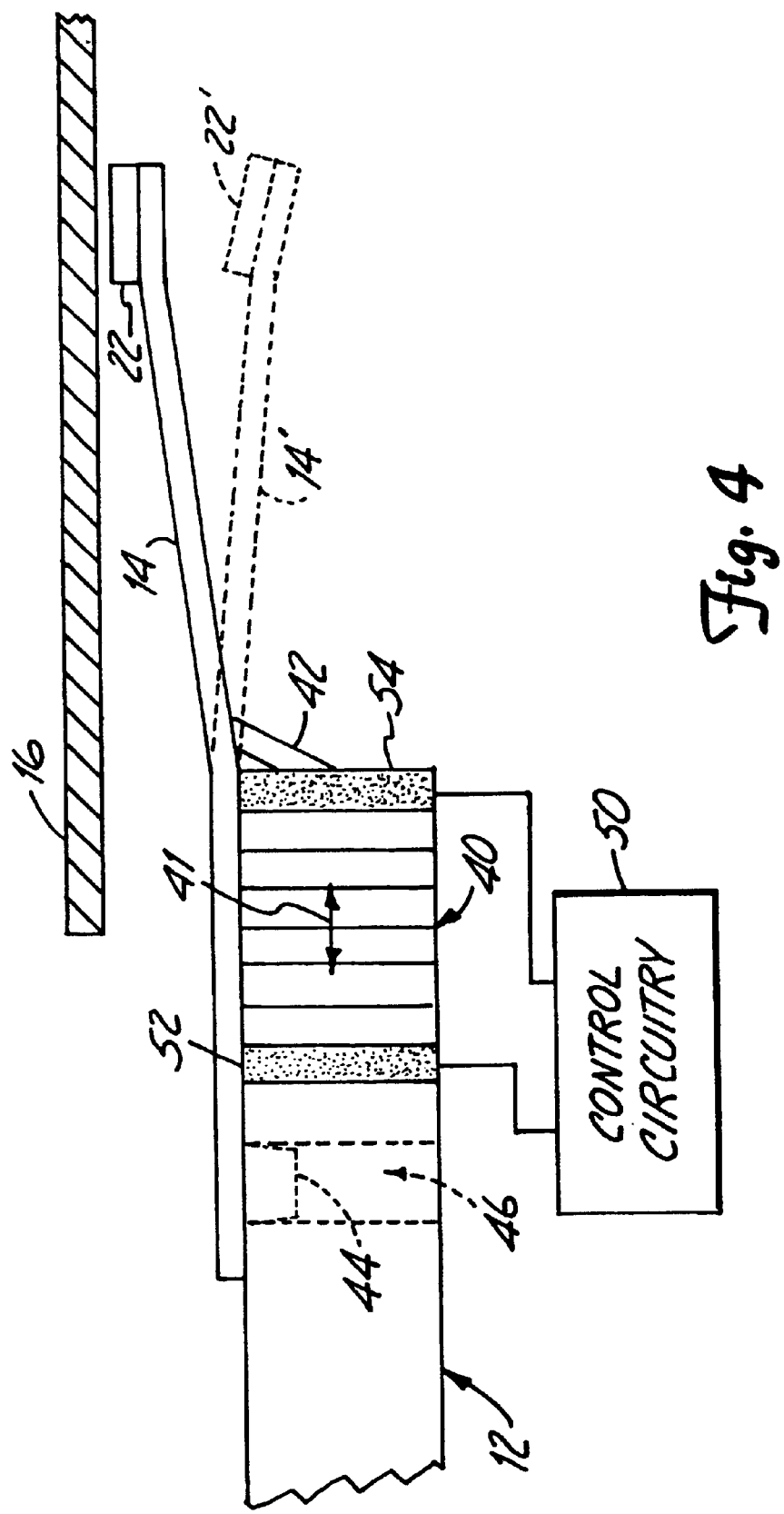
FIG. 4 is a detailed diagrammatic illustration showing a side view of a single actuator arm, flexure spring and head on a slider positioned proximate a rotating disc, utilizing the piezoelectric positioning system of the present invention.
Figure 5:
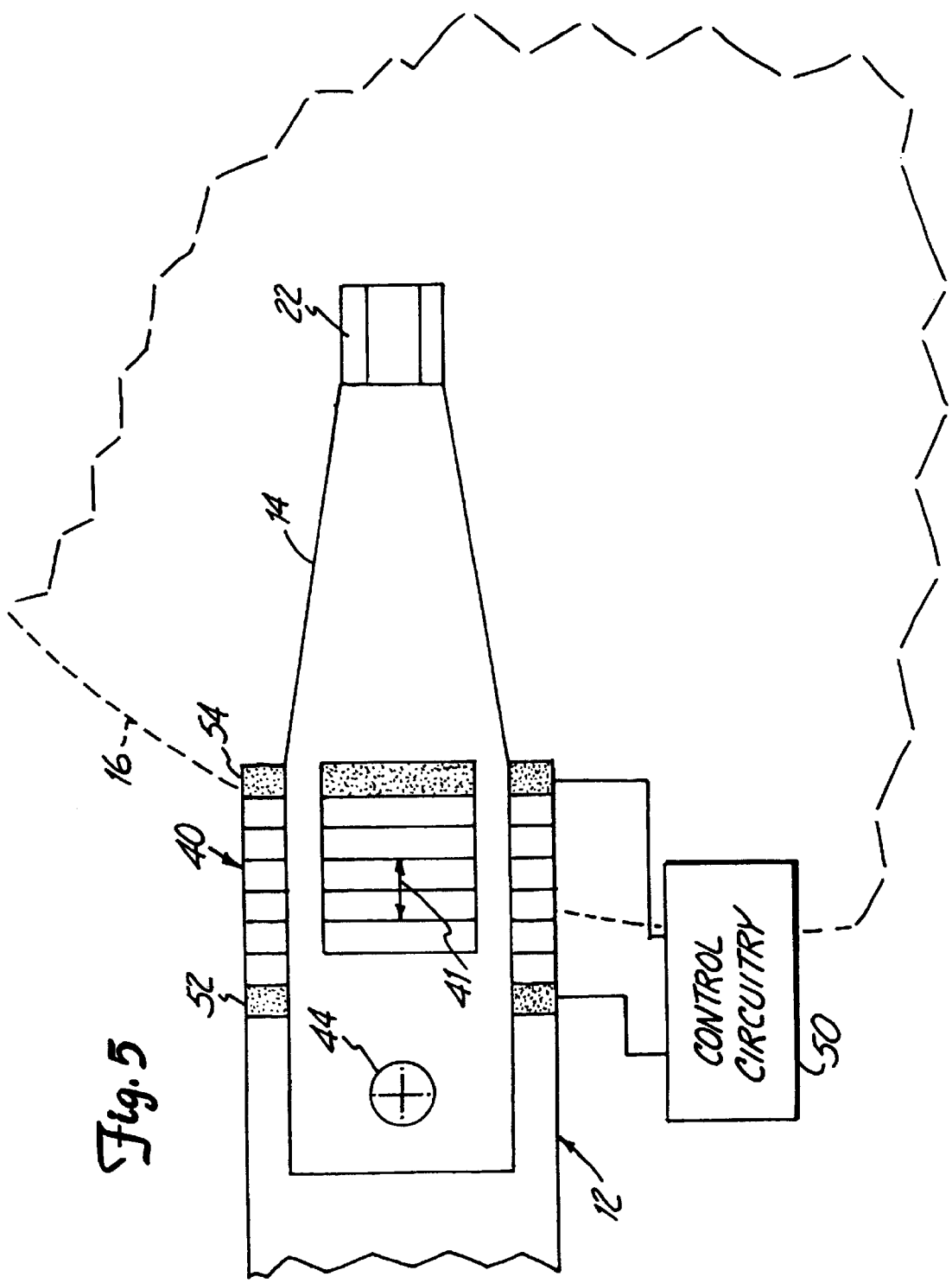
FIG. 5 is a detailed diagrammatic illustration showing a top view of the single actuator arm, flexure spring and head on a slider positioned proximate a rotating disc shown in FIG. 4.

FIG. 4 shows a detailed side view, and FIGS. 5 and 6 show detailed top views, of a portion of an actuator arm 12 designed to load the head slider 22 in position on flexure spring 14 at various heights from a disc 16, in accordance with the present invention. Actuator arm 12 includes a piezoelectric element 40 comprising a stack of layers between contact plates 52 and 54. The stack is mounted to the end of actuator arm 12 so that the principal expansion and contraction of piezoelectric element 40 is in the direction along arrows 41. Flexure spring 14 is connected to actuator arm 12 by engaging a hole 46 in the actuator arm 12, to ensure sturdy connection. Tab 42 is formed from spring 14 and bent to engage a distal end 41 of piezoelectric element 40, such as at plate 54. Tab 42 is biased against plate 54 by the spring action of flexure spring 14. Tab 42 cooperates with element 40 to alter the angular orientation of the flexure spring 14 (and thus the height of slider 22 relative to disc 16) in response to horizontal expansion or compression of the piezoelectric element 40 in the direction of arrows 41. Tab 42 may be any mechanism for varying the angular orientation of flexure 14 in response to movement of piezoelectric element 40. The natural spring bias of flexure 14 is such that when element 40 is compressed, and the disc is not rotating, flexure 14 positions slider 22 well away from the surface of disc 16. When element 40 is expanded, the flexure will position slider 22 on the disc or at a distance from the disc surface no greater than the flying height. The spring bias of flexure 14, rotational speed (and thus windage) of disc 16, and aerodynamic characteristics of slider 22 are all designed so that slider 22 is positioned precisely at the flying height from the disc surface when the disc is rotating and element 40 is expanded.

In operation, control circuitry 50 generates a voltage between terminal plates 52 and 54 at the ends of piezoelectric element 40 to control the expansion 6 and contraction of element 40 in the direction of arrows 41, depending on the desired state of operation of the disc drive system. When disc 16 is not rotating, piezoelectric element 40 is maximally compressed, so that slider 22 on flexure spring 14 is a maximum distance away from disc 16. This configuration of flexure spring 14 is shown in phantom in FIG. 4, and ensures that slider 22 will not inadvertently contact disc 16 while there is no wind to keep slider 22 aloft. Once disc 16 begins rotating, the piezoelectric element 40 is expanded a designated amount, so that head 22 on flexure spring 14 is positioned a designated distance from disc 16, for reading and/or writing data on disc 16. This configuration of flexure spring 14 is shown in solid lines in FIG. 4.

In the embodiment shown in FIG. 6, piezoelectric element 40 is configured so that expansion and contraction in the direction of arrows 41 occurs in the d31 mode, rather than the d33 mode as depicted in FIGS. 4 and 5. Either configuration may be preferred, depending on the desired ratio of movement of piezoelectric element 40 to the applied voltage.

Disc 16 is rotated at a constant rotational velocity. As a result, the linear velocity of slider 22, and hence the windage on the aerodynamic properties of the slider, is higher at the outer radial tracks than at the inner radial tracks. In one embodiment, control circuitry 50 controls the expansion and contraction of piezoelectric element 40 based on the radial position of slider 22. Control circuitry 50 operates in response to servo information to expand piezoelectric element 40 a greater amount when slider 22 is positioned over an outer radial track of disc 16 than when slider 22 is positioned over an inner radial track of disc 16, thereby compensating for different wind forces at different radial portions of disc 16 that tend to force slider 22 away from the disc surface.

The present invention simplifies head loading and unloading procedures, providing an "unloaded" configuration for holding slider 22 apart from disc 16 when disc 16 is not rotating, without moving the slider out of the region of the disc. In the example shown in FIG. 4, the "unloaded" position would be realized by full contraction of piezoelectric element 40. In this way, slider 22 is maintained a safe distance from disc 16 when disc 16 is not rotating, to ensure that slider 22 does not contact and damage disc 16.

The head on slider 22 can be loaded in position close enough to the disc 16 to effect reading and writing of data without ever actually contacting the disc 16. In the example shown in FIG. 4, this is accomplished by full expansion of piezoelectric element 40. Since slider 22 does not have to land or take off from disc 16, areas on the disc that were formerly dedicated landing zones can instead be used to encode more data, increasing the storage capacity of disc 16.

Utilizing a piezoelectric element on the actuator arm 12 enables the use of a stiffer flexure spring 14. This provides greater shock loading capability, since a greater shock force is required to move flexure spring 14 and slider 22 to cause inadvertent contact with disc 16. In addition, the stiffer flexure spring 14 lessens the need for superior aerodynamic design of slider 22, since less wind resistance is required to keep slider 22 aloft. The stiffer flexure spring 14 will tend to help keep slider 22 "flying" over disc 16. Head design can therefore be simplified.

By loading and unloading the head on slider 22 within the data cylinders of disc 16, the present invention eliminates the need for extra space in the disc drive system to accommodate a separate disengaged position of actuator arm 12, thereby saving space in the design of the disc drive system.

Although the present invention has been described with reference to preferred embodiments, workers skilled in the art will recognize that changes may be made in form and detail without departing from the spirit and scope of the invention.

What is claimed is:

1. A system for positioning a transducing head at a flying elevation proximate a rotating surface of a disc, the system comprising:

control circuitry generating electrical control signals to manage the operation of the positioning system according to operating characteristics of the disc;

an actuator arm;

a flexure spring connected to the actuator arm and carrying the head; and a piezoelectric device operatively attached between the actuator arm and a tab attached to the flexure spring the piezoelectric device being capable of expansion and contraction to alter a force applied by the tab to the flexure spring and thereby control an elevation of the head on the flexure spring from the surface of the disc in response to the electrical control signals from the control circuitry.

2. The system of claim 1 wherein the tab is arranged so that horizontal expansion of the piezoelectric device effects vertical displacement of the flexure spring.

3. The system of claim 2 wherein horizontal expansion of the piezoelectric device occurs in a d33 mode of the piezoelectric device.

4. The system of claim 2 wherein horizontal expansion of the piezoelectric device occurs in a d31 mode of the piezoelectric device.

5. In a disc drive system comprising a rotatable disc having a surface, a transducing head, an actuator arm, a flexure spring connected to the actuator arm and carrying the head, and control circuitry for generating electrical control signals to position the head proximate a predetermined area on the surface of the disc, the improvement comprising:

a piezoelectric device operatively attached between the actuator arm and a tab attached to the flexure spring the piezoelectric device being capable of expansion and contraction to alter a force applied by the tab to the flexure spring and thereby control a height of the head on the flexure spring from the surface of the disc in response to the electrical control signals from the control circuitry.

6. The system of claim 5 wherein the tab is arranged so that horizontal expansion of the piezoelectric device effects vertical displacement of the flexure spring.

7. The system of claim 6 wherein horizontal expansion of the piezoelectric device occurs in a d33 mode of the piezoelectric device.

8. The system of claim 6 wherein horizontal expansion of the piezoelectric device occurs in a d31 mode of the piezoelectric device.

9. A device for loading and unloading a transducing head in a disc drive system, the device comprising:

an actuator arm;

a flexure spring connected to the actuator arm and carrying the head;

a positioning system including a piezoelectric device, the positioning system operating to move the head on the flexure spring to a first position distant from a disc during an unloading condition, and to move the head on the flexure spring to a second position closer to the disc surface than the first position during a loading condition;

a positioning system including a piezoelectric device operatively attached between the actuator arm and a tab attached to the flexure spring, the piezoelectric device being capable of expansion and contraction to alter a force applied by the tab to the flexure spring and thereby move the head on the flexure spring to a first position distant from a disc during an unloading condition and move the head on the flexure spring to a second position closer to the disc surface than the first position during a loading condition.

10. The device of claim 9 wherein the tab is arranged so that horizontal expansion of the piezoelectric device effects vertical displacement of the flexure spring.

11. The system of claim 9 wherein horizontal expansion of the piezoelectric device occurs in a d31 mode of the piezoelectric device.

* * * * *